Nov. 12, 1963    F. C. MENNEN    3,110,233
APPARATUS FOR SHAPING METAL FOIL
Filed Nov. 29, 1960    7 Sheets-Sheet 1
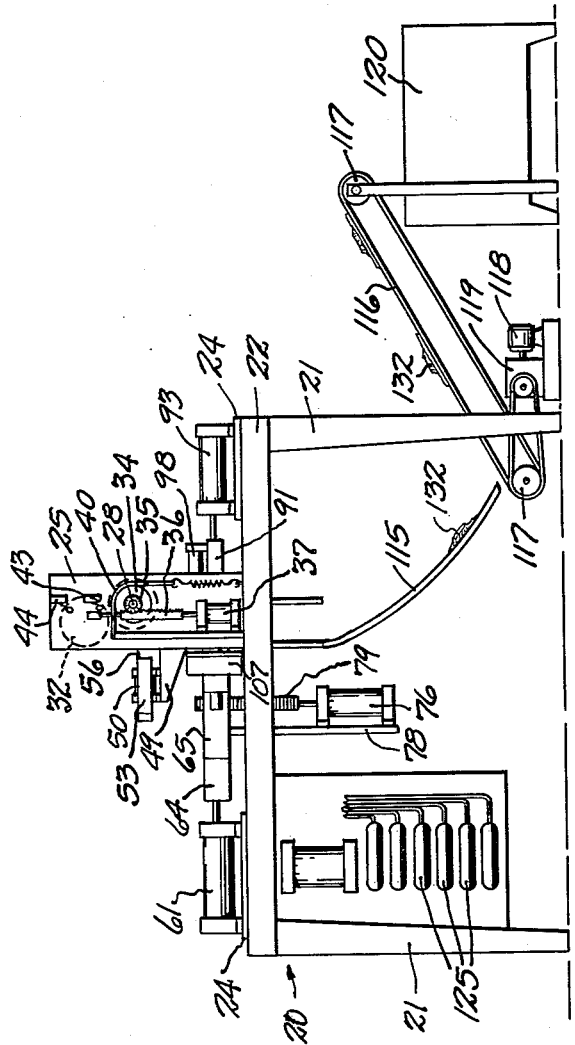
FREDERICK C. MENNEN
INVENTOR.
BY Eugene C. Knoblock
ATTORNEY

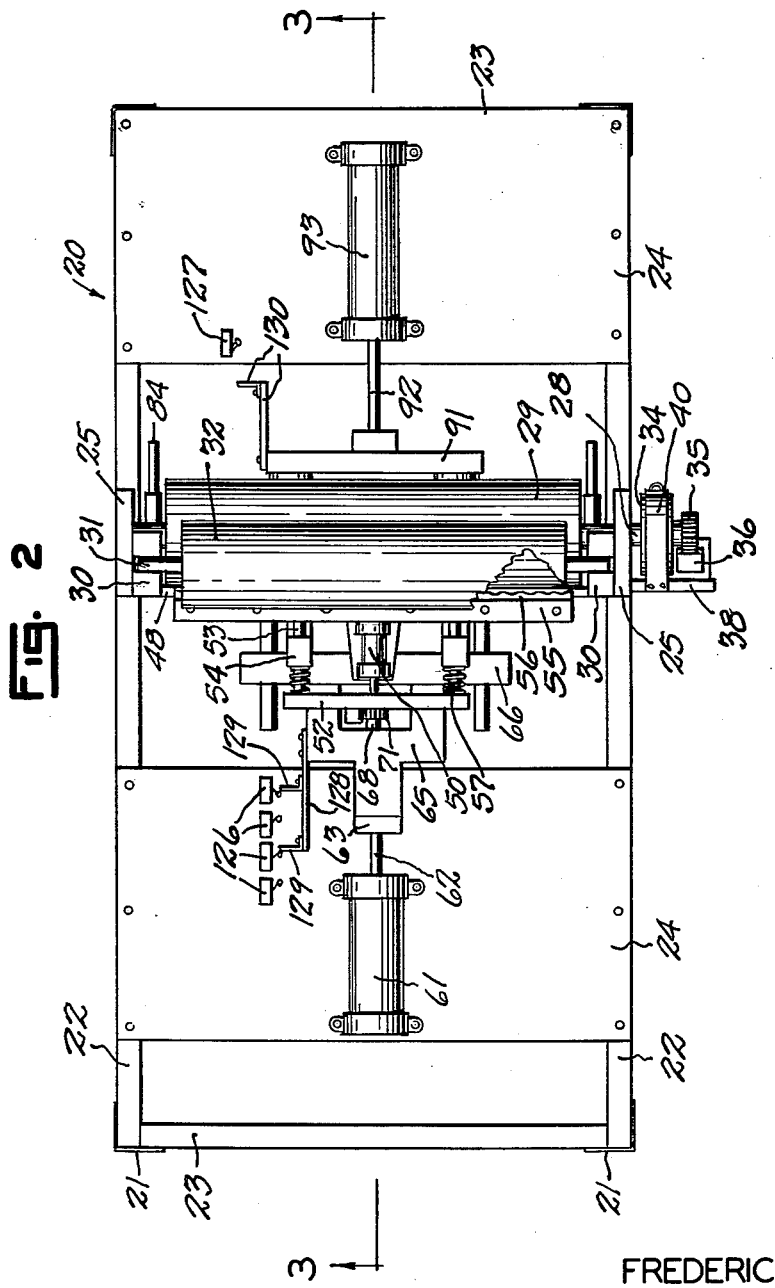

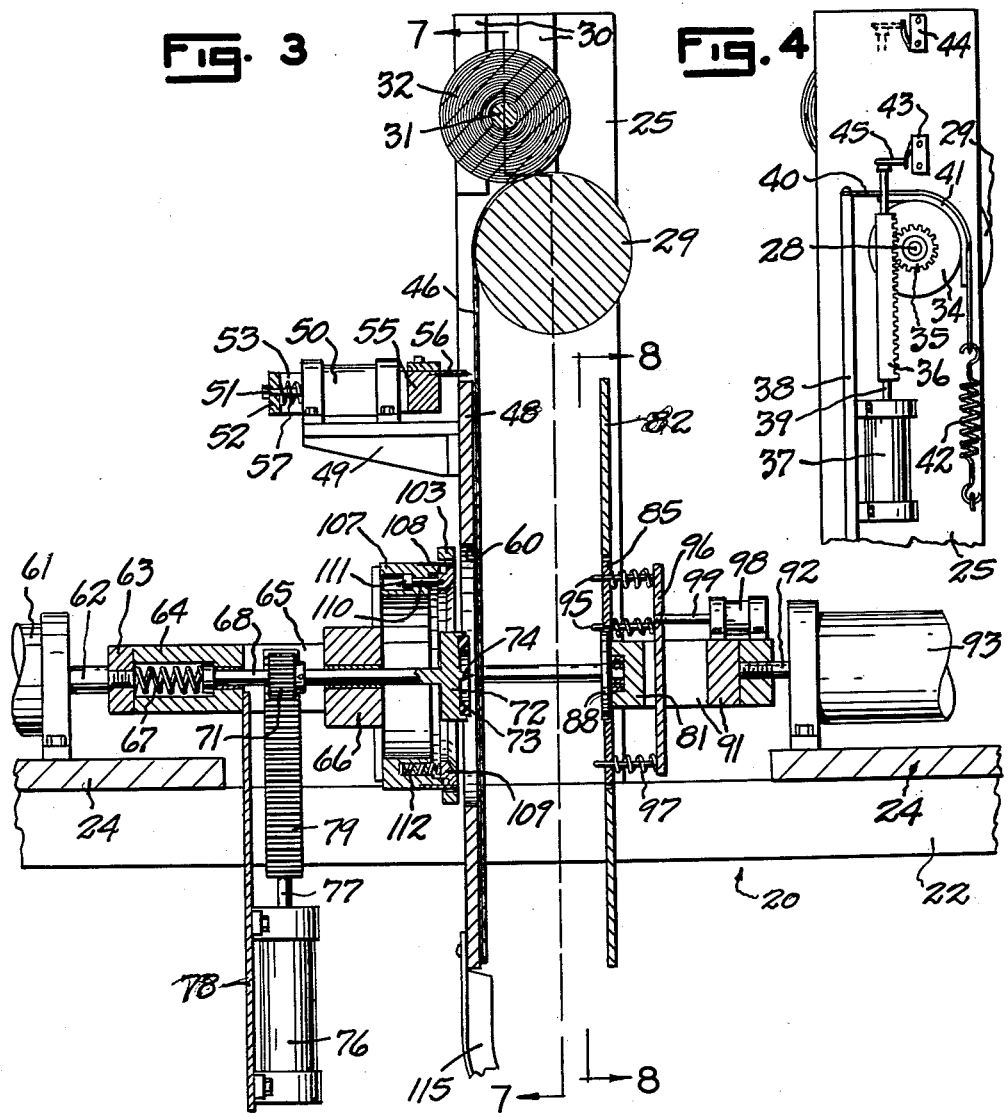
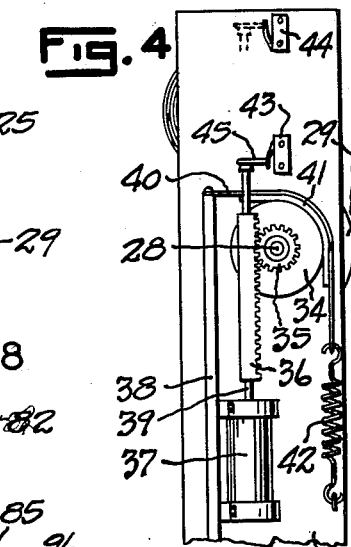

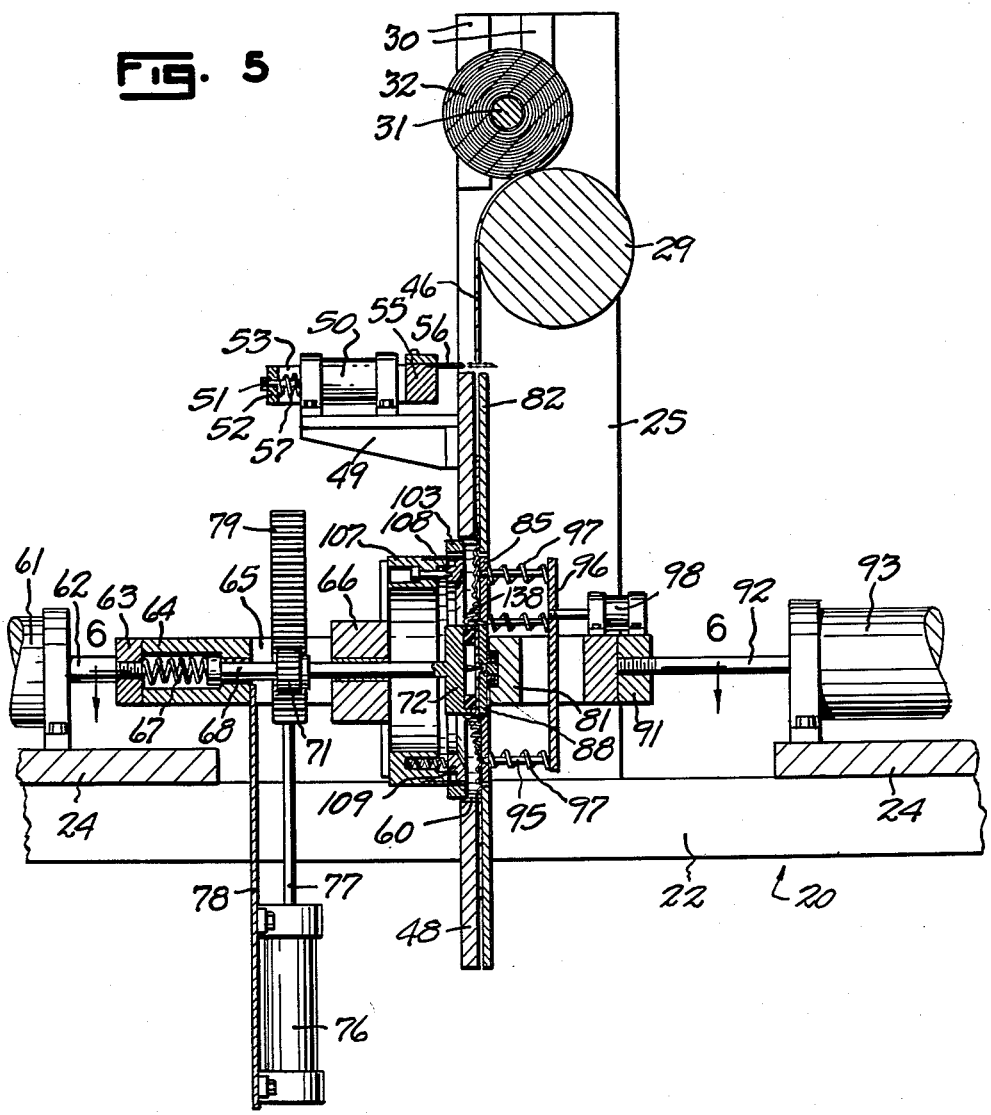

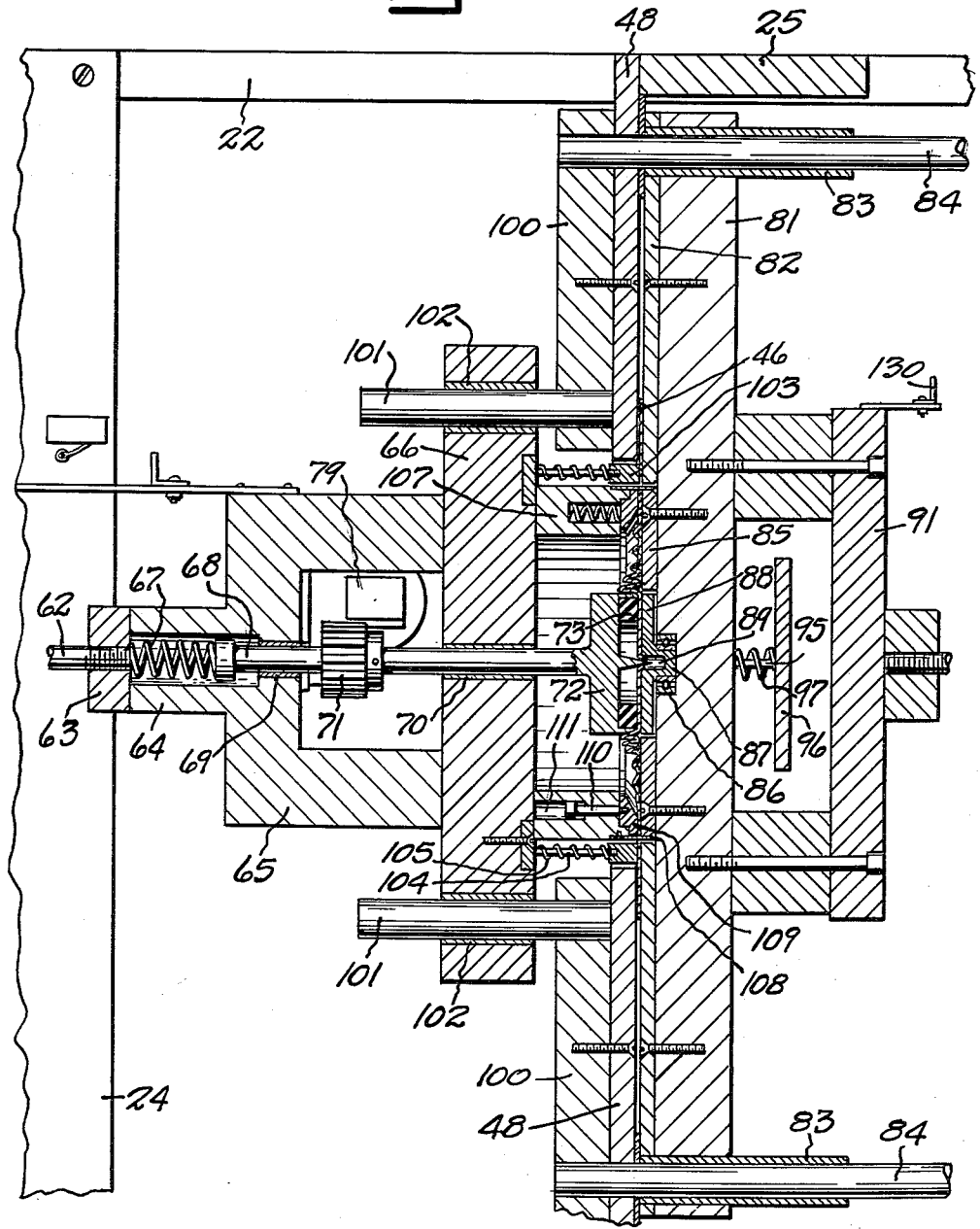

Nov. 12, 1963 F. C. MENNEN 3,110,233
APPARATUS FOR SHAPING METAL FOIL
Filed Nov. 29, 1960 7 Sheets-Sheet 6

FREDERICK C. MENNEN
INVENTOR.

BY *Eugene C. Knoblock*
ATTORNEY

Nov. 12, 1963   F. C. MENNEN   3,110,233
APPARATUS FOR SHAPING METAL FOIL
Filed Nov. 29, 1960   7 Sheets-Sheet 7
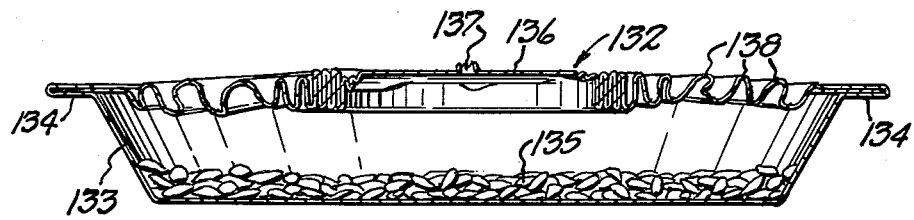
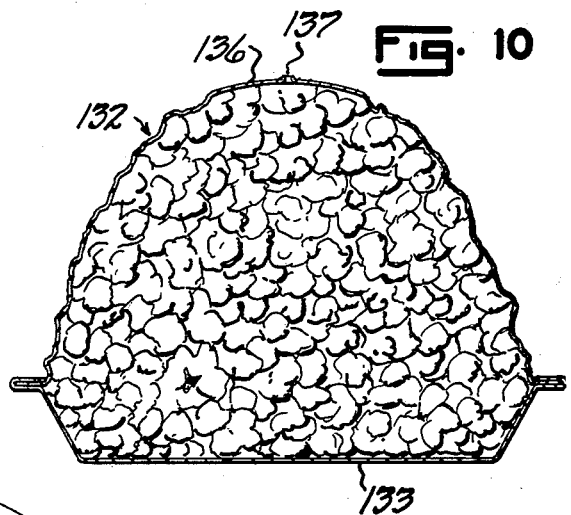
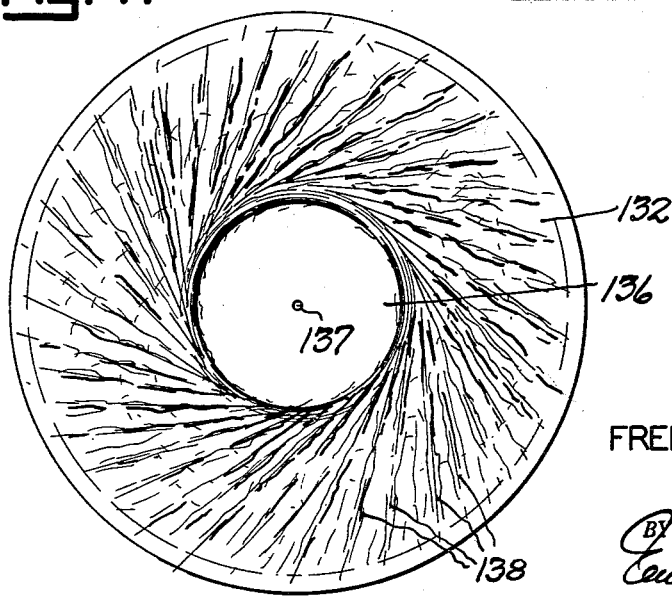
FREDERICK C. MENNEN
*INVENTOR.*
BY Eugene C. Knoblock
ATTORNEY United States Patent Office 3,110,233
Patented Nov. 12, 1963

3,110,233
APPARATUS FOR SHAPING METAL FOIL
Frederick C. Mennen, La Porte, Ind., assignor, by mesne assignments, to American Home Products Corporation, New York, N.Y., a corporation of Delaware
Filed Nov. 29, 1960, Ser. No. 72,490
14 Claims. (Cl. 93—84)

This invention relates to an apparatus for shaping metal foil.

The primary object of this invention is to provide a simple novel machine for automatically feeding foil, shaping pieces of foil, trimming the shaped pieces of foil, and discharging the finished product and the trimmed foil.

A further object is to provide a device for shaping metal foil wherein a sheet of metal foil is advanced intermittently to a forming station at which a work blank of selected size is separated from the sheet, whereupon the blank is shaped to desired form, the shaped article is trimmed to finished form, and the trimmed article and the trimmed residual material are discharged to accommodate receipt of a succeeding sheet portion at said station.

A further object is to provide a device of this character having novel means for feeding an accurately measured quantity of metal foil to a forming station at predetermined intervals automatically and in a condition and position to facilitate the forming thereof by a forming device.

A further object is to provide a device of this character with novel means for inexpensively, rapidly and economically twirling metal foil in a substantially flat contour and with radiating folds to produce a product which may be reformed to cup-shape by transversely applied fluid pressure.

Other objects will be apparent from the following specification.

In the drawings:

FIG. 1 is a view of the device in side elevation;

FIG. 2 is a top plan view of the device with parts broken away;

FIG. 3 is an enlarged fragmentary longitudinal central sectional view of the device taken on line 3—3 of FIG. 2;

FIG. 4 is a fragmentary view of the device in side elevation, illustrating a detail thereof;

FIG. 5 is a fragmentary longitudinal sectional view similar to FIG. 3 but illustrating the parts in a different position thereof;

FIG. 6 is a fragmentary horizontal sectional view taken on line 6—6 of FIG. 5 and enlarged compared to FIG. 5;

FIG. 9 is a sectional view of a food container having a formed foil cover.

FIG. 10 is a reduced sectional view illustrating the expanded condition of the food container cover;

FIG. 11 is a plan view of the formed food container cover.

Figure 7:
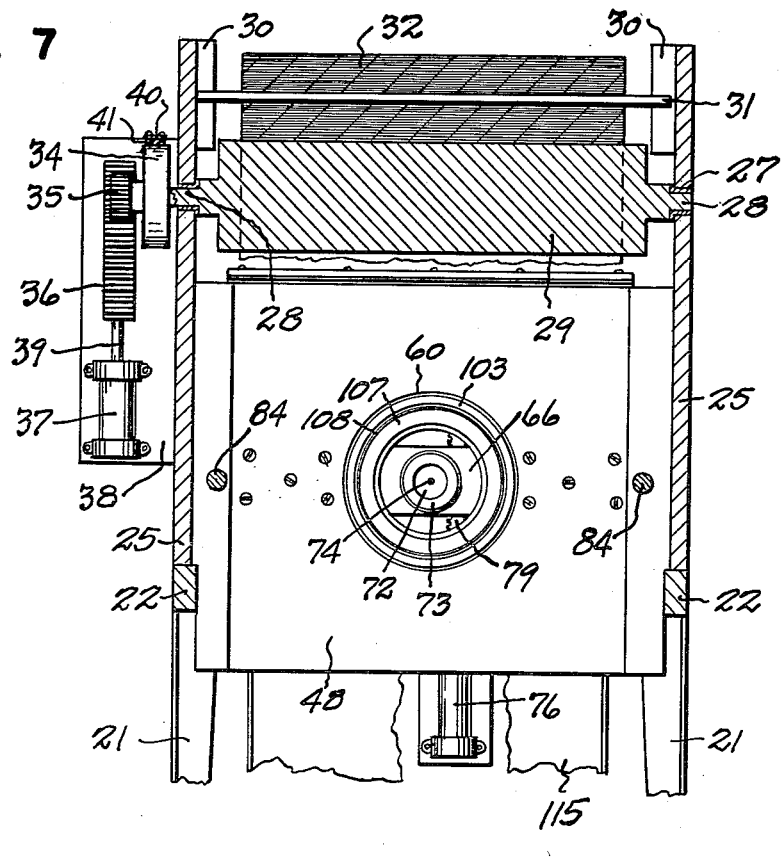
FIG. 7 is a fragmentary vertical transverse sectional view taken on line 7—7 of FIG. 3.
Figure 8:
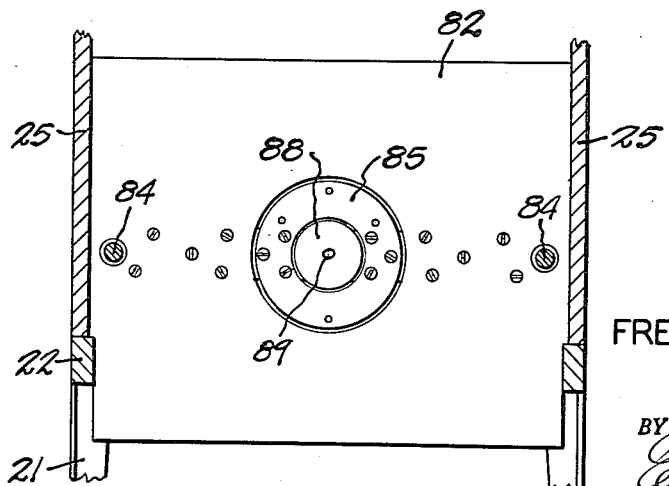
FIG. 8 is a vertical transverse sectional view taken on line 8—8 of FIG. 3.

Referring to the drawings which illustrate the preferred embodiment of the invention, the numeral 20 designates a frame or support of the device which preferably includes upright leg portions 21, longitudinal frame portions 22, transverse frame portions 23, longitudinally spaced plate or top portions 24, and upright parts 25 projecting above the level of the frame parts 22, 23 and 24 at opposite sides thereof mid-length thereof and preferably between and spaced from the frame parts 24.

The uprights 25 have aligned apertures mounting bushings or bearings 27 which journal shaft or stud portions 28 of a metering feed roll 29 whose axis extends horizontally and transversely of the machine at an elevation which spaces the roller 29 above the level of the table portions 24. At their upper ends the uprights 25 are provided with vertical guides 30 spaced apart to provide vertical guide tracks laterally offset from the axis of the roller 29 and adapted to slidably receive the opposite ends of a rod or bar 31 which mounts a roll 32 of metal foil in a position to bear upon and be supported by the uppermost surface of the feed roll 29. The foil will preferably be aluminum.

Suitable means are provided for rotating the feed roll 29 through a predetermined extent of rotation upon each actuation. One shaft end portion 28 of the feed roller 29 has driving connection with a one-way clutch 34 of any suitable construction which in turn is driven by a pinion 35. The pinion 35 meshes with a rack 36 extending vertically and actuated by any suitable power-operated mechanism, such as an air-operated double-acting cylinder piston unit whose cylinder part 37 is mounted upon an upright support 38 carried by one of the frame parts 25 and whose piston (not shown) includes a projecting stem portion 39 mounting the rack 36. The one-way clutch 34 is preferably constructed with its outer cylindrical casing portion fixed to the shaft 28 of the feed roll and rotates bodily with the feed roll upon actuation of the rack 36 in one direction by the power member 37. Means are preferably provided for retarding the rotation of the casing 34 in reverse direction and, as here illustrated, such means include a strap member 40 preferably anchored at one end upon the upper end of the support 38 and carrying a braking band 41 engageable with the peripheral surface of the housing of the one-way clutch 34. The opposite end of the band 40 is connected to a spring 42 under tension, which in turn is anchored to the frame part 25. Thus the spring serves to press the friction brake member 41 against the housing of the one-way clutch 34 at all times with sufficient pressure to hold the same and the feed roll against rotation while the clutch rotates in one direction, namely, the lost action or free-play direction of the clutch. The braking action is not sufficient, however, to introduce any detrimental resistance to rotation of the feed roll by the positive drive of the same through the clutch mechanism upon a driving stroke of the power member 37 and the rack 36.

The frame part 25 mounts a pair of spaced limit switches 43 and 44 which are engageable by a feeler member 45 carried by the upper end of the rack 36, as illustrated in FIG 4. The limit switches 43 and 44 serve as means to control the operation of an electrically actuable valve 125, such as a solenoid valve, for the purpose of controlling the suply of fluid under pressure in selected direction to one or the other of the ends of the power cylinder 37. By means of this arrangement and through control of the spacing of the switches 43 and 44, it is possible to accurately regulate the extent to which the feed roll may rotate upon each driving energization thereof in foil-feeding direction. The use of the brake means in association with the one-way clutch assures against over-travel or coasting of the feed roller. Consequently, inasmuch as the weight of the roll of foil bears against the feed roll 29, positive feeding of a selected length of the foil 46 from the foil roll 32 will occur upon each energization of the feed roller as a result of rotation of roll 32 by roll 29.

A vertical plate 48 is fixedly mounted upon the frame, as at the longitudinal frame members 22, preferably between the upright members 25 and slightly spaced from a plane in a vertical tangent of the feed roll 30, so that foil 46 fed from the feed roll 29 passes alongside the plate 48 with slight clearance, as illustrated in FIG. 3.

The plate 48 mounts a bracket or support 49 adjacent its upper end projecting from the face thereof opposite that which confronts the foil 46. A power member, such as solenoid 50, has a stem 51 connected to the crossbar 52 of a yoke member having spaced arms 53 traveling or slidable in fixed guides 54 and serving to mount a transversely extending elongated carrier 55 which mounts a cutting blade 56 of a length greater than the width of the sheet of foil 46 and preferably having a serrated cutting edge. The blade 56 is preferably located adjacent to the top edge of the vertical plate 48, as best seen in FIG. 1. Suitable springs 57 are provided to urge the plate carrier and blade to a retracted position whenever the solenoid 50 is deenergized.

Plate 48 has an opening 60 formed therein centered on an axis spaced above the level of the frame plates 24 and centered between the opposite sides of the frame and the edges of the foil sheet 46. A power-operated member 61, such as a double-acting air cylinder is provided with a reciprocating piston rod or stem 62 and is mounted upon the frame plate 24 adjacent to the upright plate 48. Stem 62 mounts a head 63 to which is secured the tubular stem portion 64 of a yoke member 65 which carries a crossbar 66. The tubular part 64 of the yoke mounts a compression spring 67 against which bears a head on the end of a shaft 68 which is journaled in a bearing 69 mounted in an aperture in the yoke and in a bearing 70 mounted in an aperture in the crossbar 66. Shaft 68 mounts a pinion 71 at the portion thereof between the bearings 69 and 70 and within the outline of the yoke 65. A head or disk 72 is mounted upon the end of the shaft 68 projecting into the opening 60 of plate 48. Disk 72 has an annular resilient ring 73 secured thereto at the foil-confronting face thereof and may have a central foil-piercing pin 74 projecting therefrom at the foil-confronting face thereof.

Suitable means are provided for rotating the shaft 68 and the head 72. As here illustrated, such means may include a power member 76, such as a double-acting air pressure cylinder having a reciprocating plunger 77 driven thereby, as by means a piston (not shown) within the cylinder 76. The cylinder 76 is preferably mounted with its axis vertical so that the stem 77 thereof travels vertically and is suitably supported in this position upon a plate or other upright 78 carried by the yoke 65 and so located as to align the axis of the stem 77 with the cavity or opening within the yoke 65. An elongated rack 79 is mounted upon the upper end of the plunger 77 and the pinion 71 meshes therewith. The rack 79 is preferably of greater width than the axial dimension of the pinion 71 so that endwise movement of the shaft 68 relative to the yoke is accommodated without disengaging the rack and the pinion, as between the positions illustrated in FIGS. 3 and 6, respectively.

A shiftable pressure resistance member 81 is positioned in spaced parallel relation to plate 48. As illustrated in FIG. 6, member 71 mounts a plate 82 confronting the plate 48. Parts 81 and 82 mount parallel tubular guides 83 which are slidably mounted upon parallel horizontal guide rods 84 or bars fixedly carried by the plate 48. The plate 82 has a circular opening therein, within which fits an annular plate 85 secured to the member 81 in concentric relation to the opening in plate 82 to provide an annular opening, for purposes to be described, which annular opening is concentric with the disk 72. Member 81 mounts a bearing 86 in a recess thereof coaxial with the disk 72, and said bearing journals the hub 87 of a spinner disk 88 freely rotatable with slight clearance within the annular plate 85 and with its inner face preferably substantially flush with the inner face of the annular plate 85. The spinner disk 88 has a central recess 89 therein to receive with clearance the perforating pin 74 of the disk 72 when the parts are in the foil-clamping position illustrated in FIGS. 5 and 6.

Member 81 is connected by a bridge member 91 or yoke to the reciprocating stem 92 of a power-actuated member 93, such as a double-acting air cylinder having a piston (not shown) to which stem 92 is connected. Power member 93 is mounted upon frame part 24 with its axis parallel to the guide rods 84 and the shaft 68 and is selectively actuable to shift the member 81 and associated parts 85 and 88 between a retracted position, as illustrated in FIG. 3, spaced from the plate 48 and a position adjacent to but slightly spaced from the plate 48, as illustrated in FIGS. 5 and 6.

A plurality of knock-out pins 95 are preferably provided to be slidable in apertures within the annular plate 85 and are preferably mounted upon a carrier 96 passing with clearance through the yoke 91 and spring-urged by springs 97 to a retracted position. A solenoid 98 is preferably mounted upon the yoke 91 and its actuating plunger or reciprocable projecting part 99 is connected with the carrier 96 and provides means for shifting the carrier 96 and the knock-out pins 95 against the action of spring 97.

The vertical plate 48 preferably carries plate portions 100, as illustrated in FIG. 6, which provide means for mounting a pair of guide rods 101 extending parallel to the guide members 84 and to the shaft 68. The crossbar 66 carried by the yoke 65 has apertured ends, preferably lined by bushings 102 and slidable upon the guides 101.

A ring 103 is adapted to fit with slight clearance within the opening 60 in the plate 48 and is mounted upon guide pins 104 slidable within openings (not shown) in the crossbar 66 and normally spring-urged by spring 105 encircling the pins 104.

The crossbar 66 mounts an annular member 107 whose outer diameter is slightly less than the inner diameter of the ring 103 with which it is concentric. The member 107 mounts a longitudinally projecting annular cutter blade 108 having slight clearance in the ring 103.

An annular presser member 109 fits with slight clearance within the outline of the portion of the annular blade 108 projecting from the annular member 107. The ring 109 mounts a plurality of spaced parallel pins 110 projecting therefrom and slidable within openings 111 formed in the annular member 107, said pins 110 being headed with the head of each adapted to seat against a shoulder in the cooperating opening 111 to limit the movement of the annular member 109 away from the member 107 by means of springs 112.

Suitable means are provided for guiding discharge of a work piece from the forming station and, in the construction shown, said means include a depending curved guide chute or plate 115 depending from the plate 48 and adapted to guide a work piece as it falls by gravity after it has been formed in the device. A delivery means receives the work piece discharged from the chute 115. The delivery means may constitute a belt 116 trained around pulleys 117, one of which is associated with a driving mechanism, such as motor 18 and a speed reducer 119. As here shown, the belt 116 may be inclined to carry the work pieces to a convenient height to permit inspection thereof and to permit removal of foil residue from the belt as the work pieces and the foil residue are moved by the belt toward a discharge container or station 120.

The device is preferably automatic in operation and the various power-actuated mechanisms are energized sequentially and periodically in repetitive operating cycles. In the form shown, wherein the various actuating mechanisms 37, 61, 76 and 93 are operated by fluid pressure, a plurality of solenoid valves 125 are provided to control the fluid pressure in the lines communicating with the respective fluid pressure actuated members. These solenoid valves may be controlled by switches, such as the limit switches 43 and 44 shown in FIG. 4, and limit switches 126 and 127 shown in FIG. 2. The yoke 64 may carry an arm 128 having one or more switch tripping members 129. The switches 126 are so positioned that they are sequentially tripped at selected time intervals as the yoke 65 travels through its stroke, said tripping action being oriented properly according to the desired sequence of operation to be performed. Similarly, the switch 127 may be tripped by a member 130 carried by the yoke 91.

The device illustrated herein is intended for the production of an expansible cover member 132 for a food container 133, such as a container for popcorn, as illustrated in FIGS. 9, 10 and 11. The cover is adapted to be anchored at its margin at 134 to the margin of the container 133 and is adapted to expand from a normal substantially flat position, as illustrated in FIG. 9, to a domed position as illustrated in FIG. 10, in response to vapor pressure within the container created incident to the cooking of food, such as the heating of kernels of popcorn 135 to pop and expand the same, as illustrated in FIG. 10. The cover 132 is characterized by a substantially flat central portion 136 having a central small perforation 137 therein. The foil is twirled to provide a plurality of folds 138 radiating from the central portion 136 thereof and extending substantially tangentially to the central portion 136.

The sequence of operations for producing the cover 132 of the foregoing construction in the instant device is as follows: Upon completion of the forming operation and the discharge of a formed piece and the foil residue via the chute 115, the actuating member 37 is actuated in a direction and manner to rotate the feed roll 29 to feed the foil sheet 46 downwardly to the position illustrated in FIG. 3. The spacing of the limit switches 43 and 44 controls the length of the foil sheet which is fed during the stroke of the actuating member 37. The brake 41 stops advance of the foil when the actuator 37 reaches the end of its feed stroke.

The plate 82 is next moved from the position shown in FIG. 3 to that shown in FIGS. 5 and 6 by the actuating member 93, and the actuating member 61 is energized to move the disk 72 from the position shown in FIG. 3 to the position shown in FIGS. 5 and 6. These operations cause the foil to be confined with clearance between the plates 48 and 82 and to be gripped or clamped between the disk 72 and the spinner 88. Preferably the movement of the disk 72 does not commence until substantially the time at which the plate 82 reaches its innermost or operative position, as illustrated in FIGS. 5 and 6. As soon as the foil is gripped between the parts 72 and 88, a control, such as one of the limit switches 126, is actuated to energize the member 50 for driving the cut-off knife 56 to separate the work blank portions of the foil sheet between the plates 48 and 82 from the portion thereof above said plates and adjacent to the feed roll 29.

When the work blank is severed from the foil supply sheet, the control, such as one of the limit switches 126 associated with and governing the energization of the power member 76, is actuated to cause member 76 to shift the rack 79 from the position of FIG. 3 to that of FIG. 5. This serves to rotate the pinion 71 and the shaft 68 on which it is mounted so as to rotate the disk 72 while said disk cooperates with the spinner 88 to clamp the central portion of the foil work piece. The rotation occurs at a sufficiently high speed to cause the formation of the folds 138 in the portion of the foil work piece surrounding the central part 136 thereof which is crimped by the parts 72 and 88. In other words, the central clamped portion 136 of the foil work blank is turned rapidly as driven by the member 72 and as accommodated by the free spinning member 88. This rapid spinning, coupled with the clearance between the plates 82 and 48, accommodates the formation of the folds 138, as illustrated in FIGS. 5 and 6. During this spinning operation the ring 103, the knife blade 108 and the ring 109 are held in retracted position clear of the foil, as illustrated in FIG. 5.

After the spin-forming operation has been completed, the power member 61 advances the yoke 65 to bring the rings 103 and 109 into contact with the foil to press the marginal portions of the foil against the plate portions 82 and 85, respectively, for the purpose of firmly gripping the margin of the foil work piece. Lost motion occurs between yoke 65 and shaft 68, as accommodated by spring 67, during advance of the yoke. Thereafter, continued energization of the power member 61 advances the annular member 107 relative to the rings 103 and 109 and in so doing advances the annular knife blade 108 to pierce the formed foil work sheet between the rings 103 and 109 as illustrated in FIG. 6, for the purpose of trimming that formed foil work sheet to desired size and configuration.

After the work piece has been cut to shape by the blade 108, the power members 61 and 93 are actuated to return the parts which are respectively associated therewith to the separated foil-releasing position illustrated in FIG. 3. As this separating action occurs, the knock-out pins 97 come into play, as by energization of solenoid 98 to disengage the work piece from the mechanism, whereby it is permitted to fall freely onto the chute 115.

It will be apparent from the foregoing description that the device operates totally automatically with the various operations being performed in proper sequence without requiring the machine operator to perform any function other than the inspection of the work pieces and the separation of the foil residue from the finished work pieces as long as proper machine-functioning continues. Of course, the attendant is required to replace the foil rolls when the foil has been expended and must be alert to any misfunctioning of the machine so that the operation of the machine can be stopped by a manual control (not shown) whenever such misfunctioning or malfunctioning occurs. The device operates automatically and rapidly to produce a metal foil product of exact predetermined size and shape and physical characteristics ready for application to intended use except for separation of pieces of scrap or foil residue therefrom and except for inspection.

While the preferred embodiment of the invention has been illustrated and described, it will be understood that changes in the construction may be made within the scope of the appended claims without departing from the spirit of the invention.

I claim:

1. A metal foil forming machine comprising a pair of plates, means for shifting one plate relative to the other between an operative position confining a piece of metal foil with slight clearance and an open position, a disk journaled by and having a surface substantially flush with the inner surface of one plate, the other plate having an opening registering with said disk, a member shiftable in said opening between release position and a position clamping a part of said foil against said disk, and means for rotating said member while in said foil clamping position.

2. A metal foil forming machine comprising an apertured plate, a second plate shiftable to and from a position for confining a sheet of metal foil with clearance, a disk journaled by said second plate, a rotor coaxial with said disk and axially shiftable in the aperture of said first named plate to and from a position for clamping said foil against said disk, and means for rotating said rotor while in foil-clamping position.

3. A metal foil forming machine comprising an upright plate, means for suspending a sheet of metal foil adjacent one face of said plate, a second plate shiftable to and from a position adjacent said first plate for confining said foil with clearance, a disk journaled in one plate, the other plate having an aperture therein, a member shiftable through said aperture to and from a position for clamping said foil against said disk, and means for rotating said member while in foil-clamping position.

4. A metal foil forming machine comprising an upright plate, means for suspending a portion of a sheet of metal foil adjacent one face of said plate, a second plate shiftable to and from a position confronting said first plate, a disk journaled by one plate, the other plate having an opening registering with said disk, a member shiftable through said opening to and from a position for clamping said foil against said disk, means for severing the portion of said foil between said plates from the remainder thereof while clamped between said members and disk, and means for rotating said member while in foil-clamping position.

5. A metal foil forming machine comprising an apertured plate, a second plate shiftable to and from a position for confining a sheet of metal foil with clearance, a disk journaled by said second plate, a rotor coaxial with said disk and axially shiftable in the aperture of said first named plate to and from a position for clamping said foil against said disk, and means for rotating said rotor while in foil-clamping position, and means for trimming said metal foil to desired size and shape after rotation thereof by said member.

6. A metal foil-forming machine, comprising means for advancing the end portion of a sheet of metal foil to a forming station, rotatable foil-clamping means at said station, means for severing said foil end portion from said sheet, and means for rotating said foil clamping means and the severed piece of foil to produce folds in the margin of said severed piece of foil.

7. A metal foil-forming machine, comprising means for advancing the end portion of a sheet of metal foil to a forming station, rotatable foil-clamping means at said station, means for severing said foil end portion from said sheet, means for rotating said foil-clamping means and the severed piece of foil to produce folds in the margin of said severed piece of foil, and means for trimming the fold-containing piece of foil to desired size and shape.

8. A metal foil-forming machine comprising means for suspending the end portion of a sheet of metal foil in selected position at a forming station, releasable foil-clamping means at said station rotatable on a horizontal axis, means for actuating said clamp means, means for severing said end portion from said sheet spaced above said clamping means, and means for rotating said clamping means and said clamped foil portion at a speed sufficient to produce folds therein extending substantially tangentially from the clamp-engaged portion of said foil.

9. A metal foil-forming machine comprising means for suspending the end portion of a sheet of metal foil in selected position at a forming station, releasable foil-clamping means at said station rotatable on a horizontal axis, means for actuating said clamp means, means for severing said end portion from said sheet spaced above said clamping means, means for rotating said clamping means and said clamped foil portion at a speed sufficient to produce folds therein extending substantially tangentially from the clamp-engaged portion of said foil, and means for actuating said foil-suspending means to advance said sheet a predetermined distance after each foil-forming operation of said rotatable clamp means.

10. A metal foil-forming machine, comprising means for advancing the end portion of a sheet of metal foil to a forming station, rotatable foil-clamping means at said station, means for severing said foil end portion from said sheet, means for rotating said foil-clamping means and the severed piece of foil to produce folds in the margin of said severed piece of foil, means for trimming the fold-containing piece of foil to desired size and shape, said trimming means including a plate confronting one face of said formed foil piece and having an endless opening therein, and a cutter confronting the other face of said formed foil piece and having an endless blade registering with said opening, and means shifting said cutter transverse of said formed foil piece.

11. A metal foil-forming machine, comprising means for advancing the end portion of a sheet of foil to a forming station, rotatable foil-clamping means at said station, means for severing said foil end portion from said sheet, means for rotating said foil-clamping means and the severed piece of foil to produce folds in the margin of said severed piece of foil, means for trimming the fold-containing piece of foil to desired size and shape, said trimming means including confronting parts positioned at opposite sides of said formed foil member, an endless blade carried by one of said trimming parts, and means for advancing said last named trimming part toward the other part to sever said formed foil part.

12. A metal foil-forming machine, comprising means for advancing the end portion of a sheet of metal foil to a forming station, rotatable foil-clamping means at said station, means for severing said foil end portion from said sheet, means for rotating said foil-clamping means and the severed piece of foil to produce folds in the margin of said severed piece of foil, means for trimming the fold-containing piece of foil to desired size and shape, said trimming means including confronting parts positioned at opposite sides of said formed foil member, an endless blade carried by one of said trimming parts, a spring-pressed endless abutment member carried by said last named trimming part adjacent said blade, and means for advancing said last named trimming part and abutment member toward the other part to sever said formed foil part.

13. A foil-forming machine comprising means for feeding the end portion of a sheet of metal foil to a suspended position with its lower edge at selected elevation, means for clamping said sheet spaced above its lower edge, means for severing said clamped sheet portion from the remainder of said sheet spaced above said clamping means, and means for rotating said clamping means and the severed sheet portion at a speed sufficient to form folds in said foil sheet portion extending from the central portion toward its edges.

14. A foil-forming machine comprising means for feeding the end portion of a sheet of metal foil to a suspended position with its inner edge at selected elevation, means for clamping said sheet spaced above its lower edge, means for severing said clamped sheet portion from the remainder of said sheet spaced above said clamping means, means for rotating said clamping means and the severed sheet portion at a speed sufficient to form folds in said foil sheet portion extending from the central portion toward its edges, and means for trimming each formed sheet portion to desired size and shape.

References Cited in the file of this patent

UNITED STATES PATENTS

| | | |
|---|---|---|
| 891,642 | Tietzmann | June 23, 1908 |
| 1,075,329 | Burpee | Oct. 14, 1913 |
| 1,902,604 | Winter | Mar. 21, 1933 |
| 1,907,760 | Egger | May 9, 1933 |
| 2,446,649 | Gregory | Aug. 10, 1948 |
| 2,638,037 | Knowlton | May 12, 1953 |
| 2,699,274 | De Villers | Jan. 11, 1955 |
| 2,819,070 | Herr | Jan. 7, 1958 |
| 2,933,261 | Falck-Pedersen | Apr. 19, 1960 |
| 3,010,372 | Lanford | Nov. 28, 1961 |